United States Patent
Mustafi et al.

(10) Patent No.: US 11,037,099 B2
(45) Date of Patent: Jun. 15, 2021

(54) SYSTEM AND METHOD FOR LIVE PRODUCT REPORT GENERATION WITHOUT ANNOTATED TRAINING DATA

(71) Applicant: salesforce.com, inc., San Francisco, CA (US)

(72) Inventors: Joy Mustafi, Telangana (IN); Lakshya Kumar, Ghaziabad (IN); Rajdeep Singh Dua, Telangana (IN)

(73) Assignee: salesforce.com, inc., San Francisco, CA (US)

( * ) Notice: Subject to any disclaimer, the term of this patent is extended or adjusted under 35 U.S.C. 154(b) by 198 days.

(21) Appl. No.: 16/436,518

(22) Filed: Jun. 10, 2019

(65) Prior Publication Data
US 2020/0387854 A1     Dec. 10, 2020

(51) Int. Cl.
| | |
|---|---|
| *G06K 9/34* | (2006.01) |
| *G06Q 10/08* | (2012.01) |
| *G06F 16/583* | (2019.01) |
| *G06F 16/953* | (2019.01) |
| *G06K 9/62* | (2006.01) |
| *G06T 7/70* | (2017.01) |
| *G06K 9/03* | (2006.01) |
| *G06K 9/32* | (2006.01) |

(52) U.S. Cl.
CPC ....... *G06Q 10/087* (2013.01); *G06F 16/5846* (2019.01); *G06F 16/953* (2019.01); *G06K 9/036* (2013.01); *G06K 9/3258* (2013.01); *G06K 9/6261* (2013.01); *G06T 7/70* (2017.01); *G06K 2209/01* (2013.01); *G06K 2209/27* (2013.01); *G06T 2207/30242* (2013.01)

(58) Field of Classification Search
None
See application file for complete search history.

(56) References Cited

U.S. PATENT DOCUMENTS

| | | |
|---|---|---|
| 7,730,478 B2 | 6/2010 | Weissman |
| 7,779,039 B2 | 8/2010 | Weissman et al. |
| 9,141,886 B2* | 9/2015 | Auclair ............... G06Q 10/087 |

(Continued)

OTHER PUBLICATIONS

OpenCV 2.4.13.7 documentation, OpenCV Tutorials, imgproc module, Image Processing, "Hough Line Transform," retrieved from https://docs.opencv.org/2.4/doc/tutorials/imgproc/imgtrans/hough_lines/hough_lines.html on Jan. 27, 2020, pp. 1-8.

(Continued)

*Primary Examiner* — Feng Niu
(74) *Attorney, Agent, or Firm* — Haynes and Boone, LLP

(57) ABSTRACT

Embodiments described herein provide a method for obtaining information on product inventory and placement in a retail setting. An image including unannotated image data indicative of the retail setting is received. One or more shelves in the retail setting are determined from the unannotated image data, and the image is segmented into one or more sub-images corresponding to the one or more detected shelves. For each sub-image corresponding to a respective detected shelf, a product name is then and a number of appearances of the product name are detected using text recognition on the respective sub-image. Product inventory information and first placement information are derived based at least in part on the detected number of appearances and a shelf level corresponding to the sub-image.

20 Claims, 10 Drawing Sheets

(56) References Cited

U.S. PATENT DOCUMENTS

| | | | |
|---|---|---|---|
| 9,158,988 B2* | 10/2015 | Patel | G06F 16/583 |
| 9,330,084 B1 | 5/2016 | Kadambi et al. | |
| 9,430,557 B2 | 8/2016 | Bhat et al. | |
| 9,495,355 B2 | 11/2016 | Mungi et al. | |
| 9,514,185 B2 | 12/2016 | Mungi et al. | |
| 9,535,894 B2 | 1/2017 | Carrier et al. | |
| 9,613,091 B2 | 4/2017 | Mungi et al. | |
| 9,619,261 B2 | 4/2017 | Gaurav et al. | |
| 9,684,876 B2 | 6/2017 | Agarwalla et al. | |
| 9,766,945 B2 | 9/2017 | Gaurav et al. | |
| 9,811,754 B2* | 11/2017 | Schwartz | G06K 9/6218 |
| 9,916,303 B2 | 3/2018 | Mungi et al. | |
| 9,916,538 B2* | 3/2018 | Zadeh | G06K 9/627 |
| 10,133,732 B2 | 11/2018 | Mungi et al. | |
| 10,275,712 B2 | 4/2019 | Bhat et al. | |
| 10,275,713 B2 | 4/2019 | Bhat et al. | |
| 10,318,641 B2 | 6/2019 | Mustafi et al. | |
| 10,353,739 B2 | 7/2019 | Gaurav et al. | |
| 10,360,532 B2* | 7/2019 | Chen | G06T 7/001 |
| 10,373,107 B2* | 8/2019 | Kawashima | G06Q 10/083 |
| 10,417,581 B2 | 9/2019 | Agarwalla et al. | |
| 10,426,551 B2 | 10/2019 | Gupta et al. | |
| 10,445,821 B2* | 10/2019 | Graham | G06Q 30/0643 |
| 10,452,924 B2* | 10/2019 | Adato | G06F 16/55 |
| 10,489,229 B2 | 11/2019 | Mustafi et al. | |
| 10,521,513 B2 | 12/2019 | Mustafi et al. | |
| 10,521,914 B2* | 12/2019 | Lam | G06K 9/3233 |
| 10,565,548 B2* | 2/2020 | Skaff | G06K 9/3216 |
| 10,625,426 B2* | 4/2020 | Bogolea | B25J 11/008 |
| 10,713,621 B2* | 7/2020 | Bogolea | G06K 9/4642 |
| 10,726,273 B2* | 7/2020 | Phan | G06K 9/00771 |
| 10,846,512 B2* | 11/2020 | Adato | G06K 9/00624 |
| 2008/0077511 A1* | 3/2008 | Zimmerman | G06Q 10/00 705/28 |
| 2009/0059270 A1* | 3/2009 | Opalach | G06Q 10/087 358/1.15 |
| 2013/0051611 A1* | 2/2013 | Hicks | G06T 11/60 382/103 |
| 2014/0003729 A1* | 1/2014 | Auclair | G06Q 10/087 382/224 |
| 2015/0117788 A1* | 4/2015 | Patel | G06Q 10/087 382/199 |
| 2015/0262116 A1* | 9/2015 | Katircioglu | G06K 9/00771 705/28 |
| 2016/0171429 A1 | 6/2016 | Schwartz | |
| 2016/0180533 A1 | 6/2016 | Pavani et al. | |
| 2016/0292153 A1 | 10/2016 | Agarwalla et al. | |
| 2017/0039192 A1 | 2/2017 | Mustafi et al. | |
| 2017/0052985 A1 | 2/2017 | Guggilla et al. | |
| 2017/0052988 A1 | 2/2017 | Guggilla et al. | |
| 2018/0111769 A1 | 4/2018 | Yuvaraj et al. | |
| 2018/0114142 A1* | 4/2018 | Mueller | G06N 5/04 |
| 2018/0160894 A1 | 6/2018 | Gupta et al. | |
| 2018/0165728 A1* | 6/2018 | McDonald | G06Q 30/0241 |
| 2019/0034864 A1* | 1/2019 | Skaff | G06K 7/1413 |
| 2019/0149725 A1* | 5/2019 | Adato | H04N 1/32144 348/158 |
| 2019/0180150 A1* | 6/2019 | Taylor | G06T 3/0062 |
| 2019/0213212 A1* | 7/2019 | Adato | G06F 16/235 |
| 2019/0236531 A1* | 8/2019 | Adato | G06K 9/00771 |
| 2019/0362265 A1 | 11/2019 | Agarwalla et al. | |
| 2020/0380876 A1* | 12/2020 | Sachdeva | G06T 17/05 |

OTHER PUBLICATIONS

Rosebrock, "OpenCV OCR and Text Recognition with Tesseract," Deep Learning, Optical Character Recognition (OCR), Tutorials, retrieved from https://www.pyimagesearch.com/2018/09/17/opencv-ocr-and-text-recognition-with-tesseract/ on Jan. 27, 2020, pp. 1-24.

Rosebrock, OpenCV Text Detection (EAST text detector), Deep Learning, Optical Character Recognition (OCR), Tutorials, retrieved from https://www.pyimagesearch.com/2018/08/20/opencv-text-detection-east-text-detector/ on Jan. 27, 2020, pp. 1-15.

* cited by examiner

SYSTEM AND METHOD FOR LIVE PRODUCT REPORT GENERATION WITHOUT ANNOTATED TRAINING DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to automatic product inventory auditing and more specifically to systems and methods for live product report generation without annotated training data.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many product manufacturers may sell their goods through distributors or retailers. In some cases, the product manufacturer may enter into an agreement with the distributor or retailer to have its goods placed in certain locations in a retail setting (e.g., at the end of an aisle) in order to increase prominence and sales. When such agreements are in place, periodic audit reports may be required, for example, to ensure compliance. An audit report is usually prepared by an inspector by examining an account or a store setting of the distributor, retailer, or other organization. For example, for a retail store or a warehouse, an audit report usually includes information such as the inventory of a specific product. In addition to inventory information, a merchant, a marketer, or a manufacturer of the specific product may also be interested in knowing the placement of the specific product in the retail setting, e.g., how and where the specific product is placed on a retail rack relative to other competing products. Such information is often collected by a human inspector manually counting the products and recording the location of the products on site, which requires a significant amount of investment in time and labor.

Figure 1:
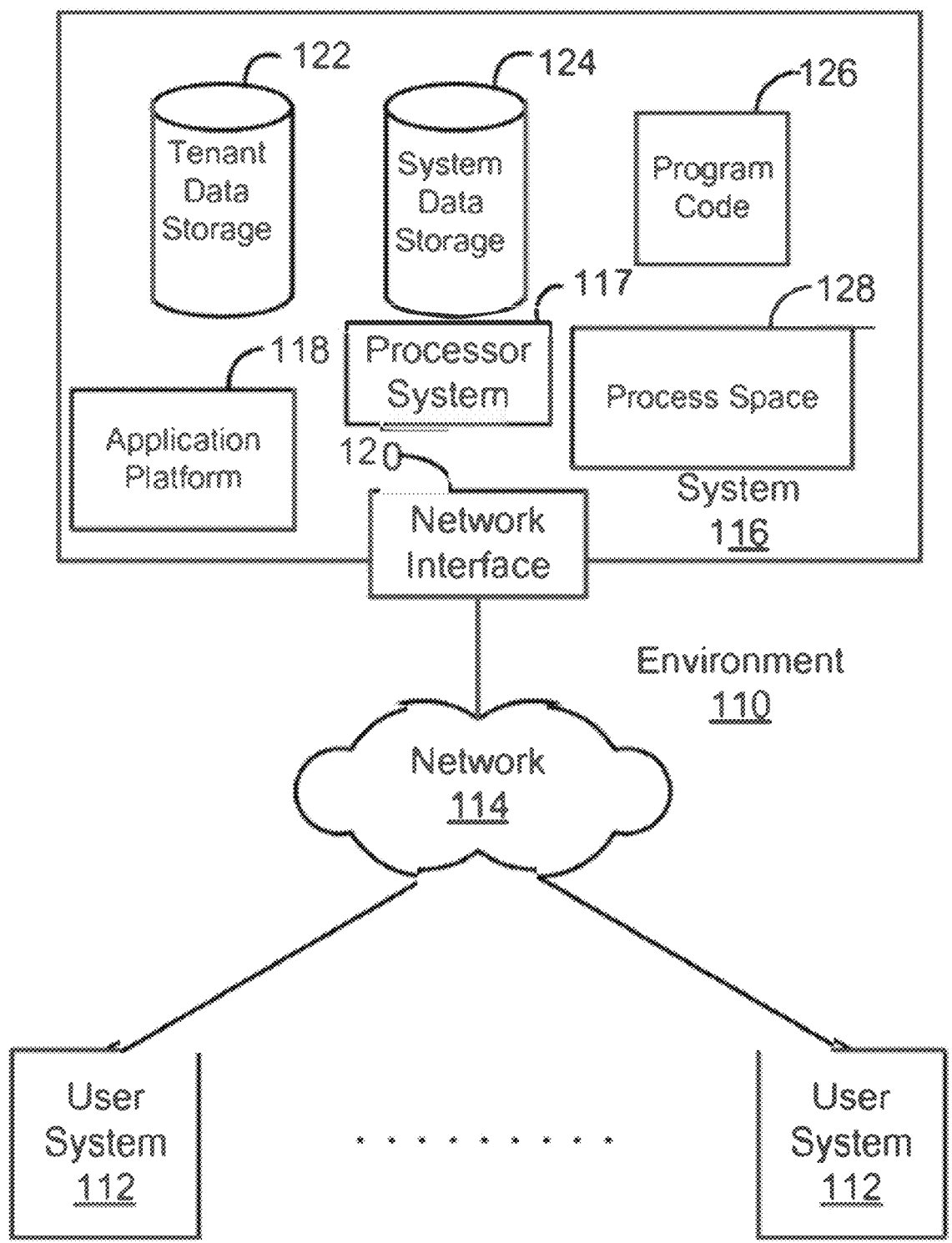
FIG. 1 illustrates a block diagram of an example environment wherein systems and methods for live audit generation in unannotated image data may be provided and used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

As used herein, the term "object localization" refers to the process by which bounding boxes identifying one or more objects in an image is generated with classifiers or class labels for the objects and bounding boxes. This object localization process produces annotated data of the image, which may in turn be used to train a neural network to identify the same or similar objects in other images through object detection.

Overview

Some existing systems attempt to automatically identify product inventory information by object localization via machine learning based on annotated image data. For example, such existing object localization system can be built on a neural network that is trained using annotated image data. The annotated image data includes not just a classifier or class label of objects in images, but also includes bounding box information that describes the location of the objects in the images. By training the object localization system with the annotated image data, the object localization system may respond to a new input image with image detection results, which identifies the same or similar objects in the new input image. However, the annotated data for training requires a large number of images, which in turn require a large amount of manual input to annotate such large number of images. Thus, building and using existing object localization systems to generate an audit report is often cumbersome and labor-intensive as well.

In view of the need for an efficient product inventory and placement information generation mechanism, embodiments described herein provide systems and methods for obtaining product inventory and placement information from an unannotated live image. In some examples, embodiments described herein may be built on a database system accessible by a plurality of separate organizations (e.g., merchants, manufacturers, distributors, marketers, etc.), such as a multi-tenant database system. Specifically, the database system stores and provides a live audit report generation framework that utilizes unsupervised image process techniques such as edge detection, text recognition, and/or the like to generate the product inventory and placement information from unannotated image data, such as a raw image captured by an image capture device. The captured raw image does not include any annotated bounding box information and/or class labels for objects within images.

The database system may therefore receive and store unannotated image data of images having one or more objects within the images. At least some images stored by the database system are associated with particular organizations or customers of the multi-tenant database system that request an audit report of objects within images. For example, the particular organizations may include, but are not limited to, a marketer, a manufacturer, a merchant, a distributor, an auditor, and/or the like.

The embodiments described herein provide methods, computer program products, and computer database systems for a live audit report generation framework that provides product inventory and placement information in a retail setting using only unannotated raw images captured by an image capture device. An online system may provide users of the live audit report generation framework with access to online services. In some examples, the online system may be a web-based CRM system that provides employees of an enterprise with access to CRM software applications to obtain a live audit report of a specific product. As part of providing the services to users, the online system stores the unannotated image data as well as resulting product inventory and placement information, and/or the audit report.

In this way, an audit report of inventory and placement information of specific products can be generated without excessive time and labor spent on annotating image data and training an object localization network. In some examples, the audit report may be generated in real time in response to capturing a live image in a retail setting.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the object localization framework client or server-side for use in object localization with unannotated image data, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
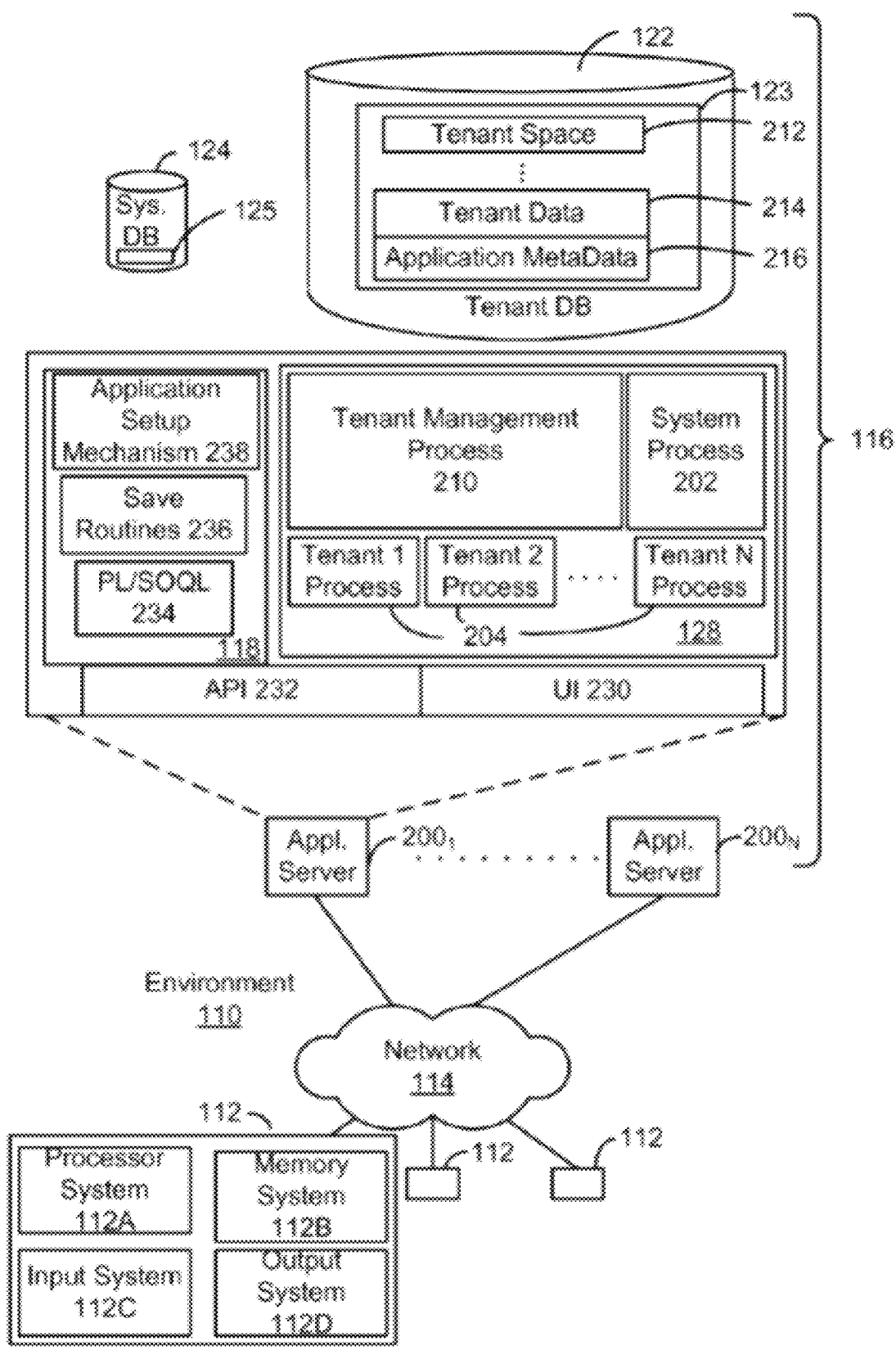
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

Neural Model

According to some embodiments, in a multi-tenant database system accessible by a plurality of separate and distinct organizations, such as system 116 shown and described with respect to FIGS. 1 and 2, a live audit module is provided for live product inventory and placement information generation using unannotated image data. The live audit module may be installed or implemented at a computing device shown in FIG. 3.

Figure 3:
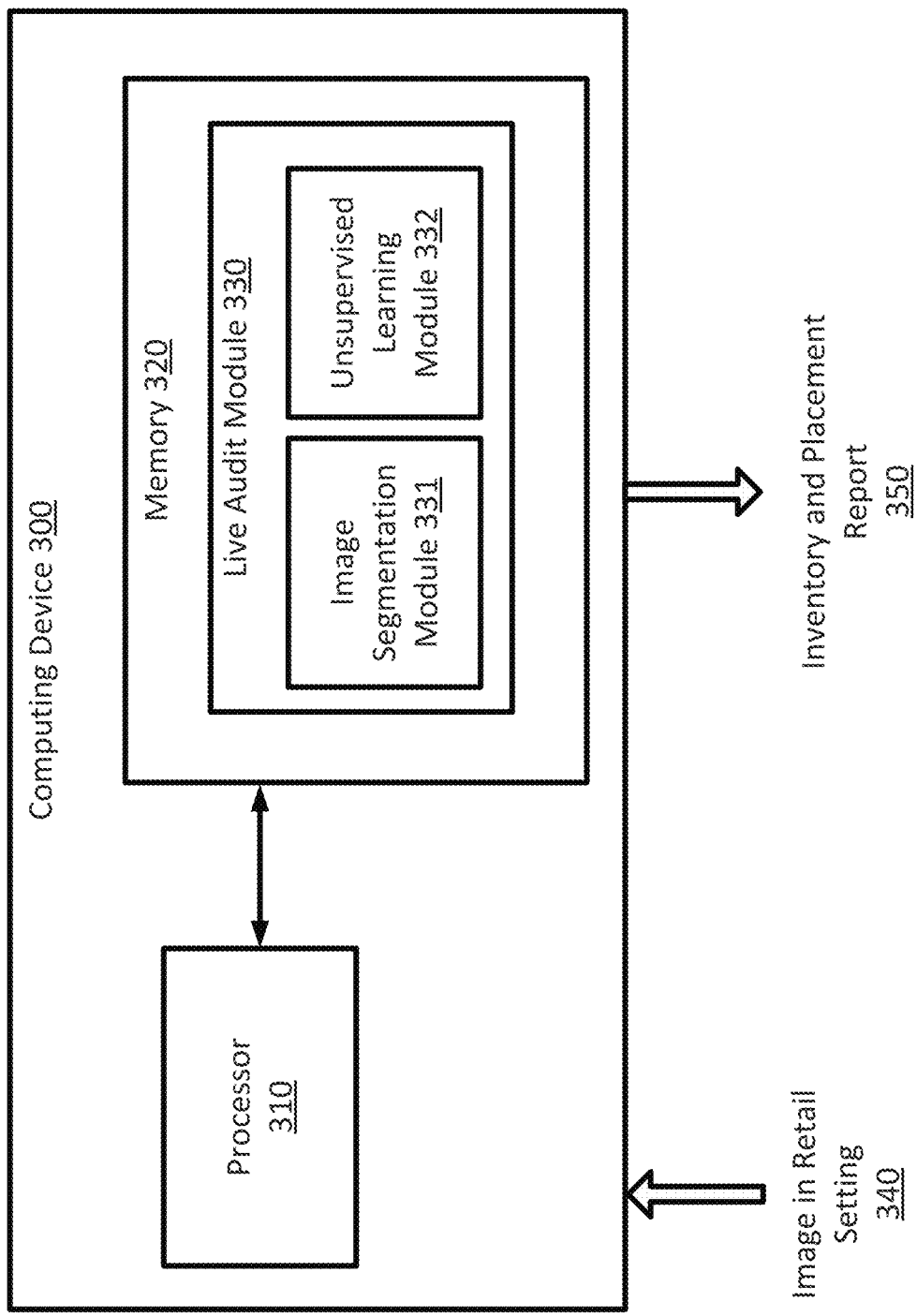
FIG. 3 is a simplified diagram of a computing device implementing live audit report generation, according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a live audit module 330 for generating product inventory and placement information of a specific product based on an input of an unannotated image 340 taken in a retail setting. For example, the input image 340 may include a rack having multiple shelf levels of products. The live audit module 330 further includes sub-modules such as the image segmentation module 331 and an unsupervised learning module 332. Specifically, the image segmentation module 331 is configured to segment the input image 340 into one or more sub-images corresponding to one or more shelf levels, e.g., by edge detection of different levels of shelves in the input image 340. The unsupervised learning module 332 is configured to, for each sub-image corresponding to a specific shelf level, detect a product name, e.g., by text recognition on the respective sub-image, based on which the number of products shown on the image can be inferred. Further details on operations of the image segmentation module 331 and the unsupervised learning module 332 are further described in relation to FIGS. 4-10.

After implementing and executing the live audit module 330, in some embodiments, the inventory and placement report 350 provided by live audit module 330 is global for the multi-tenant database system, such as system 116, and applied to or used for all organizations or tenants whose users or customers utilize system 116 for data object generation, management, and use. Computing device 300 may receive or intake unannotated image data 340 (e.g., a live image and/or video without bounding boxes or class labels for objects within the image data) from a user of an organization or tenant accessing the database system. The input image 340 of unannotated image data can be any type data in that it can take the form of multi-media content, including images, videos, and the like. In some embodiments, the input image 340 of unannotated image data is not constrained, restricted, or required to be in a particular form. Computing device 300 can receive the unannotated image data 340 through a user interface, a communication interface via a communication network, and/or the like.

Figure 4:
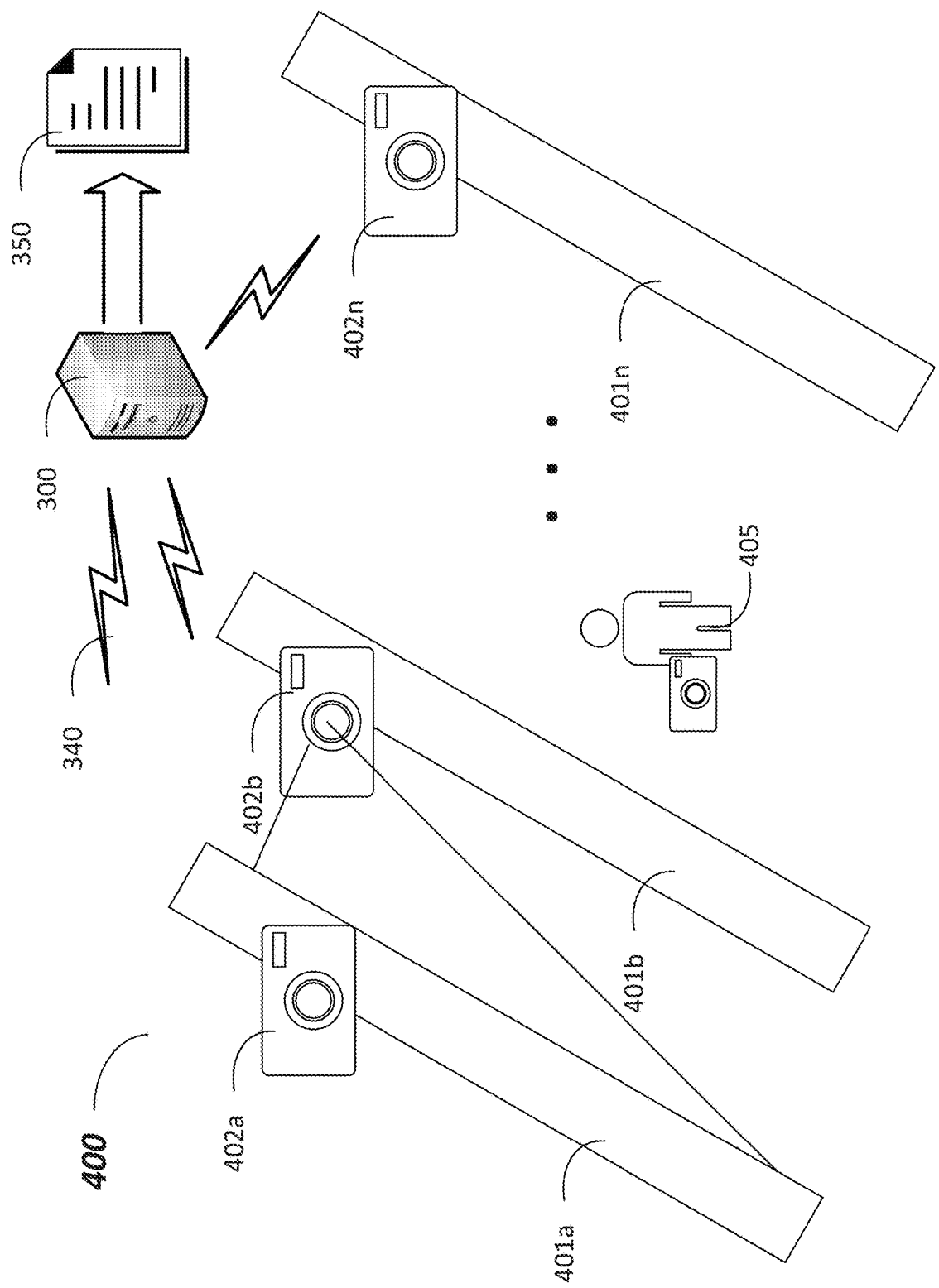
FIG. 4 is a simplified diagram illustrating a retail setting at which one or more image capture devices may be installed to capture an input image or video to the computing device described in FIG. 3, according to embodiments described herein.

FIG. 4 is a simplified diagram 400 illustrating a retail setting at which one or more image capture devices may be installed to capture an input image or video to the computing device 300 described in FIG. 3, according to embodiments described herein. Diagram 400 shows a retail setting having one or more rows of racks 401a-n. An example of such retail setting is a grocery store with multiple racks, each rack having one or more shelves stocked with products. An image capture device 402 can be used to capture images of the racks. In some embodiments, each rack may be equipped with an image capture device 402a-n. In some examples, the image capture device 402a-n may be a surveillance camera, and/or the like. In some examples, an image capture device 402b is placed and positioned on the rack, e.g., 401b, so as to capture visualization of the adjacent rack 401a.

In some examples, the image capture devices 402a-n may be configured to periodically, intermittently or constantly capture an image or video of the adjacent rack and send the captured image or video as an input 340 to computing device 300, e.g., via a wired or wireless communications network. The computing device 300 may be housed locally at, or remotely to the retail setting. As each image capture device 402a-n captures imagery of a specific rack, the input 340 also includes metadata associated the captured image identifying the captured rack, e.g., based on an identifier of the image capture device.

In some examples, an inspector 405 may operate a camera to capture images of racks 401a-n. The inspector 405 may submit the captured images with identifying information of the rack captured in each image, e.g., via a user interface of computing device 300.

In some examples, the input 340 includes a set of images captured consecutively. The image capture devices 402a-n may be configured to capture consecutive images at different angles, e.g., at three different positions while the camera facing the adjacent rack rotates from left to right. The image capture devices 402a-n may be configured to capture consecutive images at different time intervals, e.g., five images with two minutes apart, to obviate obstruction of the view of the rack, e.g., when a customer walks by and happens to block the camera.

Upon receiving the input images 340, computing device 300 may determine an input image with the best quality, e.g., with the least noise (least blurry), with no obstruction (e.g., no customer blocking the view of the rack), etc., for identifying product information. Or, alternatively, for a set of consecutive images taken at different angles, computing device 300 may aggregate the product inventory and placement information determined from each input image, e.g., by computing an average of the identified product numbers determined from multiple input images that are taken from different angles of the rack.

In some examples, for each input image, computing device 300 may generate product inventory and placement information (e.g., as shown in process 800 in FIG. 8), and a confidence indicator (e.g., high, medium, low, etc.) associated with the product inventory and placement information based on the image quality of the input image. When the input image is blurred, or has obstruction, a low confidence indicator may be associated with the product information. In some examples, computing device 300 may adopt the product inventory and placement information with the highest confidence indicator.

Computing device 300 may then take the input image(s) 340 and generate a live audit report 350 using the raw and unannotated image data from the input image(s) 340.

Figure 5:
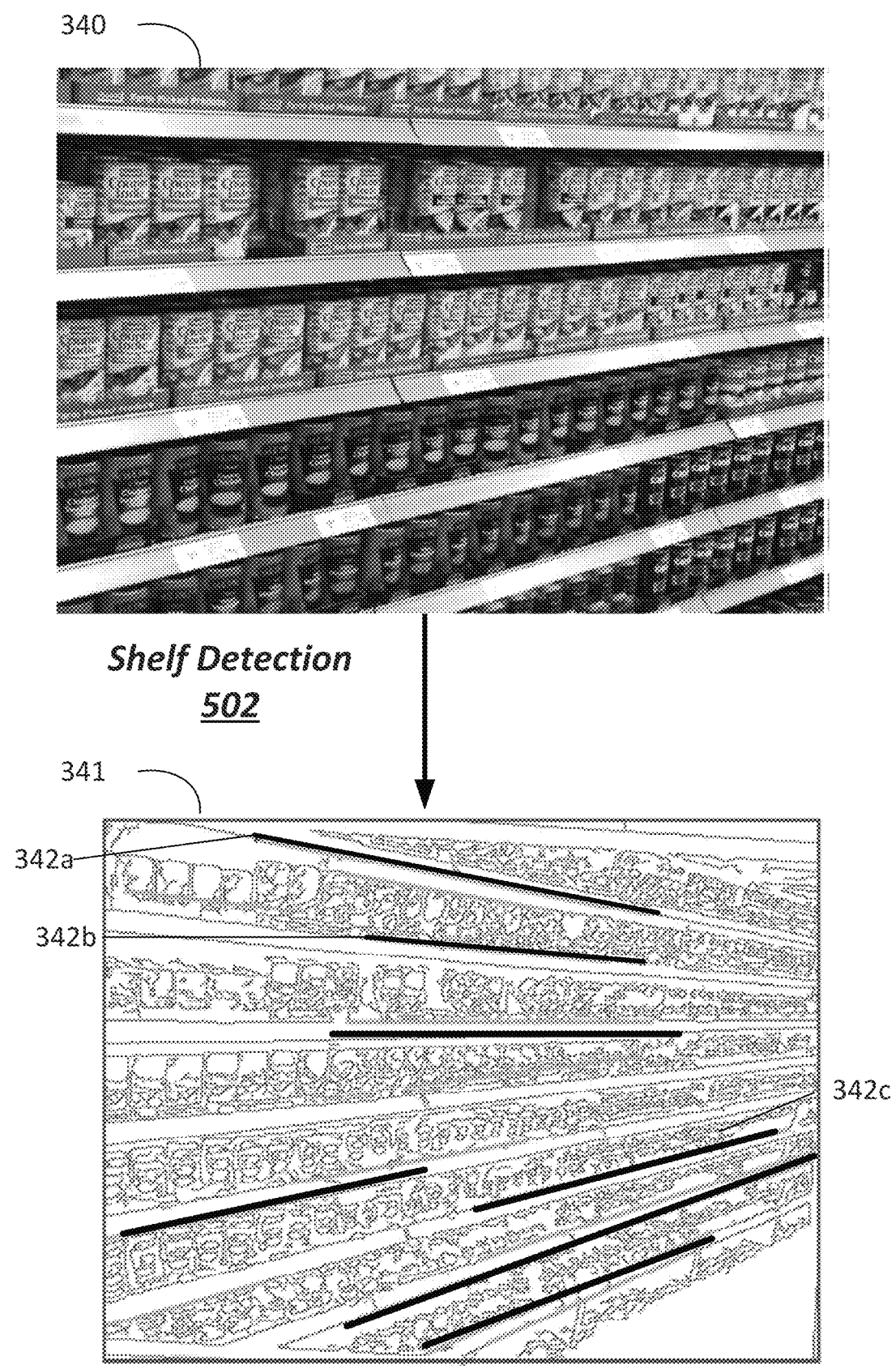
FIG. 5 is a simplified diagram illustrating aspects of shelf detection on an example input image, according to some embodiments.

FIG. 5 is a simplified diagram illustrating aspects of shelf detection 502 on an example input image 340, according to some embodiments. As shown, input image 340 may illustrate a rack comprising several shelf levels of products. The image segmentation module 331 may perform shelf detection 502, e.g., by edge detection on the input image 340, to obtain image data 341 of "edges" in the input image 340. The image segmentation module 331 may then identify possible shelf edges in the "edge" image 341, e.g., by identifying straight lines 342a-c that are longer than a pre-defined length and/or are within a pre-defined threshold angle (e.g., <45 degrees) with the horizontal axis of the image.

Figure 6:
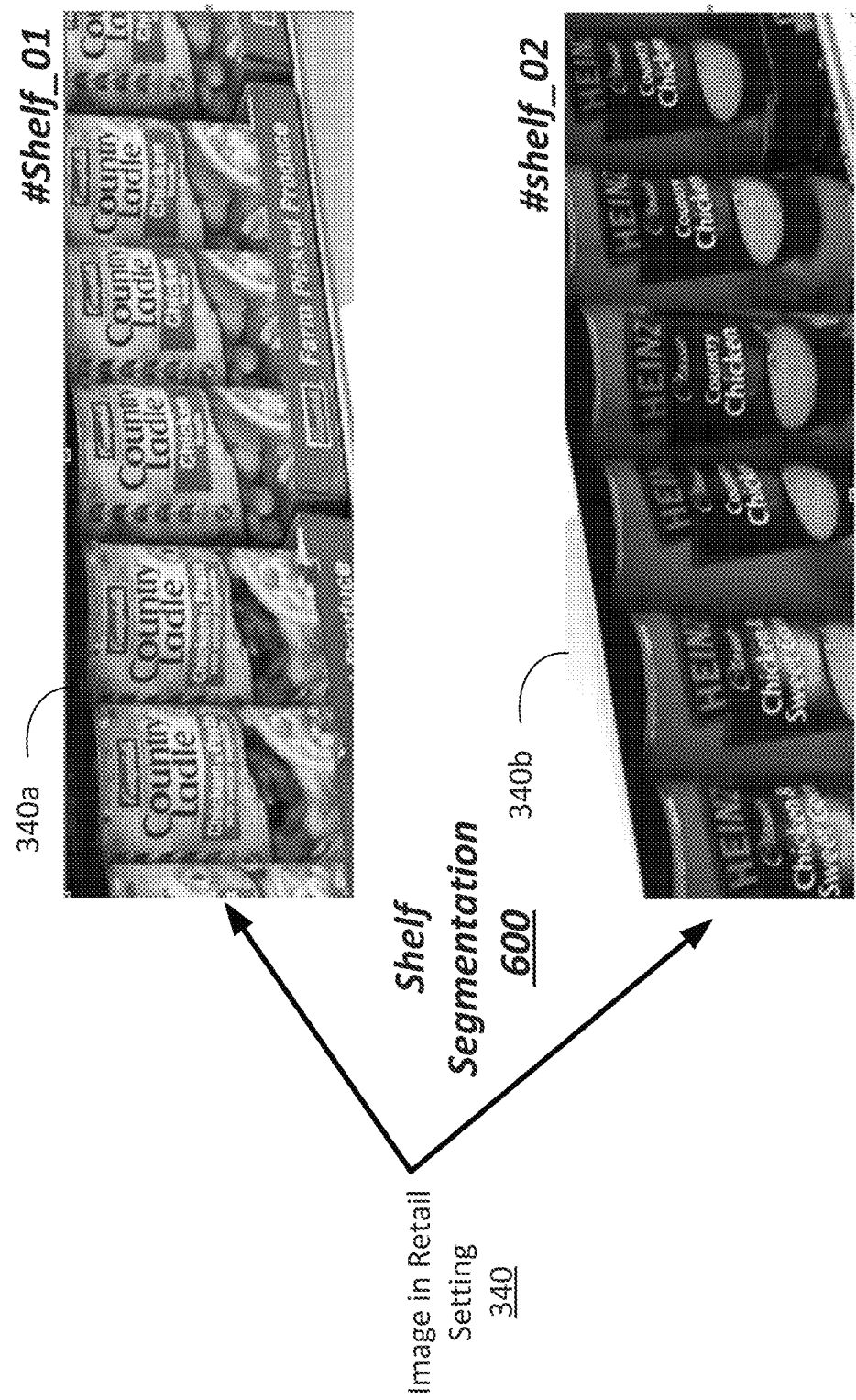
FIG. 6 is a simplified diagram illustrating aspects of shelf segmentation of the input image, according to some embodiments.

FIG. 6 is a simplified diagram illustrating aspects of shelf segmentation 600 of the input image 340, according to some embodiments. Upon identifying the shelf edges as shown in FIG. 5, the image segmentation module 331 may segment the input image 340 into sub-images, e.g., shelf images 340a-b. In some embodiments, each sub-image 340a-b corresponds to the portion of input image 340 of a single shelf level. The image segmentation module 331 may add a shelf identifier (e.g., a numeric number that identifies the shelf level, etc.) to the metadata associated with each sub-image 340a-b to identify the corresponding shelf of each sub-image.

Figure 7:
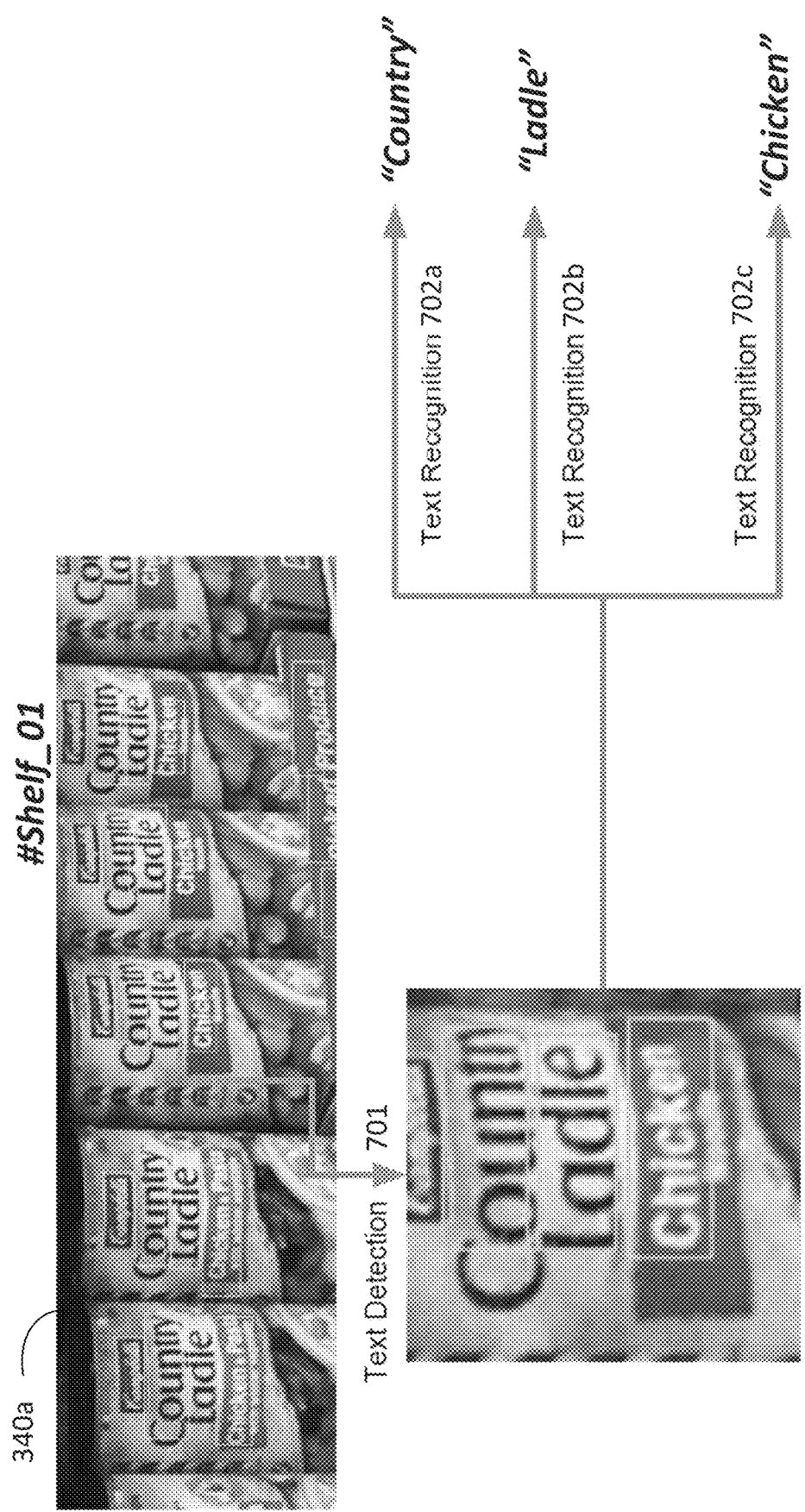
FIG. 7 is a simplified diagram illustrating aspects of text recognition on each sub-image, according to some embodiments.

FIG. 7 is a simplified diagram illustrating aspects of text recognition on each sub-image 340a, according to some embodiments. Upon obtaining a set of sub-images 340a-b from the input image 340, the unsupervised learning module 332 may perform text recognition on each sub-image. For example, without any object localization model trained by annotated image data, the unsupervised learning module 332 retrieves a sub-image 340a and identifies a text area on the sub-image 340a via text detection 701. Upon detecting textual areas on the sub-image 340a, the unsupervised learning module 332 perform text recognition 702a-c for each textual area to identify the text, e.g., "country," "ladle," "chicken." The text detection 701 and text recognition 702a-c are performed without product-level training.

Figure 8:
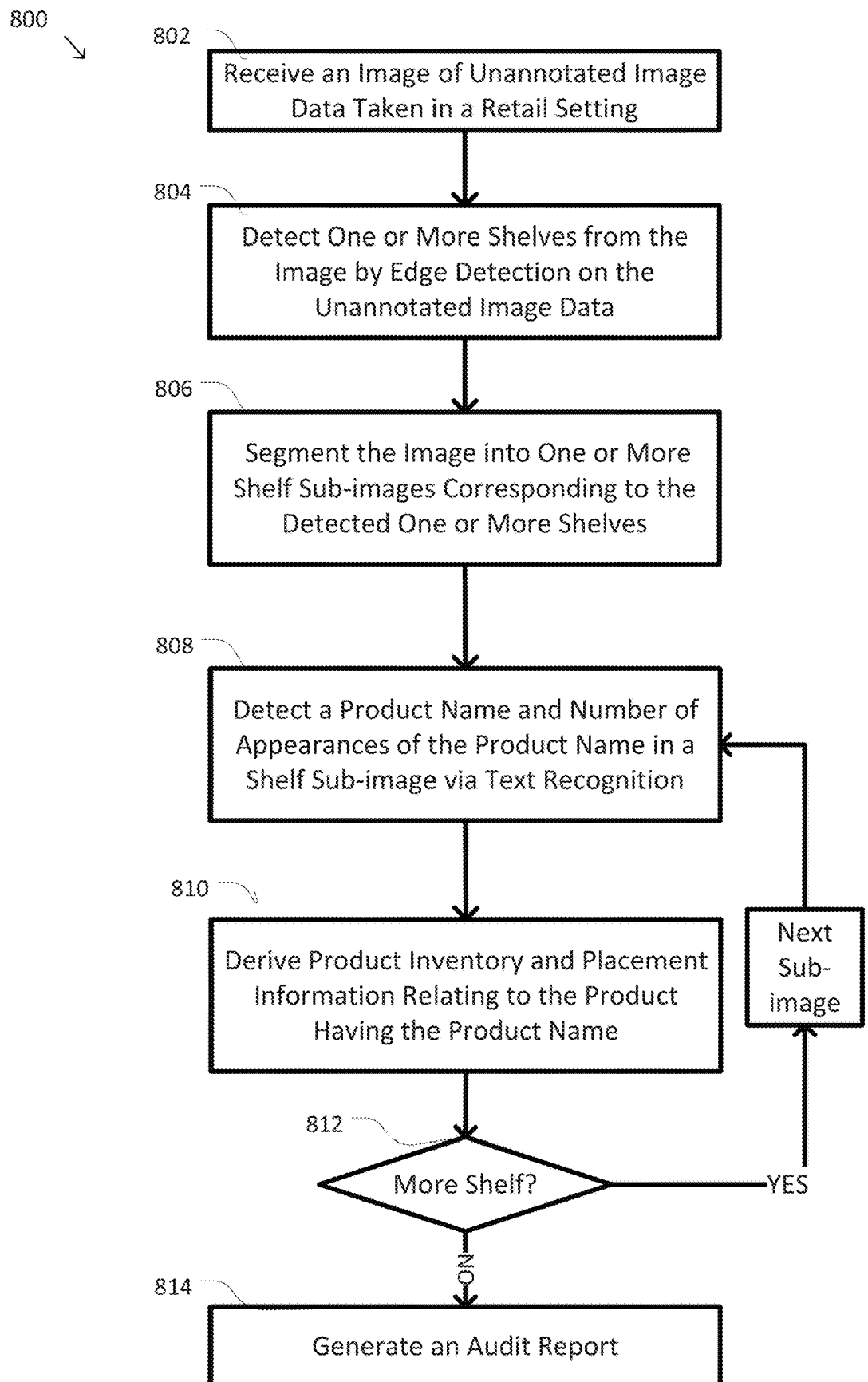
FIG. 8 is a simplified logic flow diagram illustrating a method for obtaining product inventory and placement information from unannotated images in a retail setting shown in FIG. 4, according to some embodiments.

FIG. 8 is a simplified logic flow diagram illustrating a method 800 for obtaining product inventory and placement information from unannotated images in a retail setting 400 shown in FIG. 4, according to some embodiments. Method 800 starts at process 802, at which an image (e.g., input image 340) of unannotated image data taken in a retail setting is received, e.g., taken by a camera 402a-n in FIG. 4. The received image is received with metadata indicating a rack number corresponding to the image.

At process 804, one or more shelves from the image is detected by edge detection on the unannotated image data, e.g., as shown by the shelf detection process 502 in FIG. 5. At process 806, the input image is segmented into one or more shelf sub-images corresponding to the detected one or more shelves, e.g., as shown by the sub-images 340a-b in FIG. 6. At process 808, a product name and the number of appearances of the product name in a sub-image is detected via text recognition, e.g., as shown at text recognition 702a-c "country ladle chicken" in FIG. 7. At process 810, product inventory and placement information relating to the product having the product name is derived, e.g., 24 appearances of "country ladle chicken" on shelf number 01. Method 800 then proceeds to determine whether more shelves are to be processed at process 812. If there are more shelves, e.g., sub-images to be processed, method 800 repeats processes 808 and 810 to process the next sub-image. In some examples, product information relating to the product name that appears on different sub-images may be aggregated to obtain a total count of the products on the rack. If no more shelf is to be processed, method 800 proceeds to process 814, at which an audit report is to be generated based on the product inventory and placement information. An example audit report data structure is provided in FIG. 10.

Figure 9:
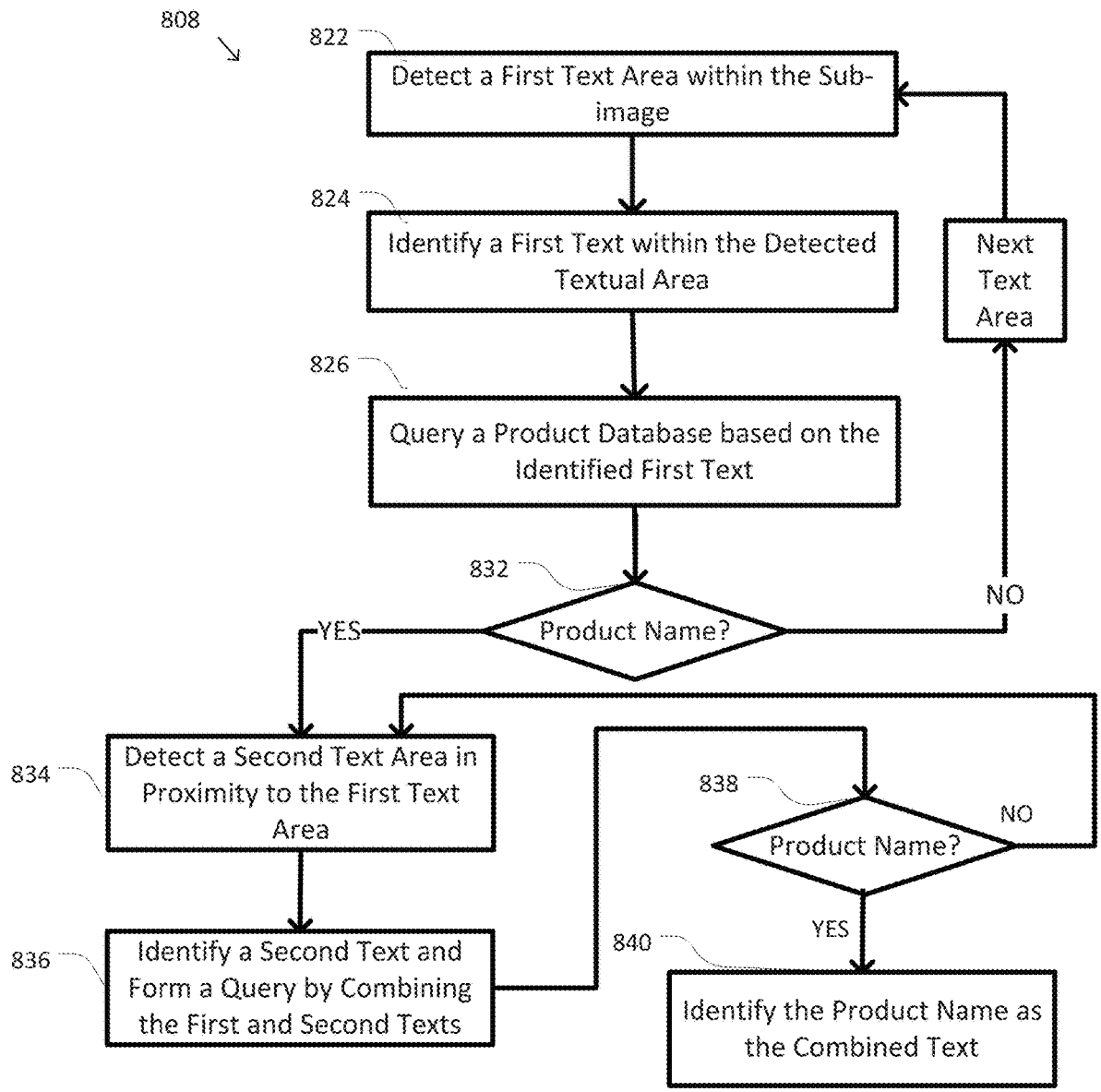
FIG. 9 is a simplified logic flow diagram illustrating process of detecting a product name and the number of appearances of the product name in a shelf sub-image via text recognition shown in FIG. 8, according to some embodiments.

FIG. 9 is a simplified logic flow diagram illustrating process 808 of detecting a product name and the number of appearances of the product name in a shelf sub-image via text recognition shown in FIG. 8, according to some embodiments. Process 808 may start at sub-process 822, at which a first text area within the sub-image is detected. At sub-process 824, a first text within the detected textual area may be identified. For example, as shown in FIG. 7, a text area containing the text "country" or "ladle" may be identified. At sub-process 826, a product database may be queried based on the identified text, e.g., "country ladle." At sub-process 832, when no product name is identified using the recognized text, e.g., when text recognition identified a text area containing text "net weight: 12 Oz" which does not match with any product name, process 808 proceeds to identify the next text area and repeats sub-processes 822-832.

At sub-process 832, when a product name containing "country ladle" is identified, process 808 proceeds to sub-process 834, at which process 808 may detect a second text area in proximity to the first text area. In some examples, the second text area is within a number of pre-defined distance (e.g., a number of pixels, etc.) to the first text area.

At sub-process 836, a second text may be identified and may be combined with the first text to refine the product query. For example, the first text "country ladle" may relate to a number of product names in the "country ladle" series, such as "country ladle" farmhouse vegetable soup, "country ladle" chicken noodle soup, and/or the like. A second text, e.g., "chicken," that is identified in proximity to the first text "country ladle," may be combined to formulate a query based on "country ladle chicken" on the product database. At sub-process 838, when a product name is identified which at least partially matches with the combined first and second texts, e.g., the product name of "Campbell country ladle chicken noodles soup" identified from the text "country ladle chicken," process 808 proceeds to sub-process 840, at which the product name is identified from the query result using the combined text. In some examples, process 808 may repeat identifying texts that are in proximity to each other and thus refine the product name identification until a unique query result that matches the combined text is identified.

At sub-process 838, when no product name is identified using the combined text, e.g., a combined text of "country ladle net weight: 12 oz" which likely matches no product name, process 808 proceeds to sub-process 834 and repeats sub-processes 834-836 to find another text area that contains a text that can be combined with the first text to yield a refined product name search.

Figure 10:
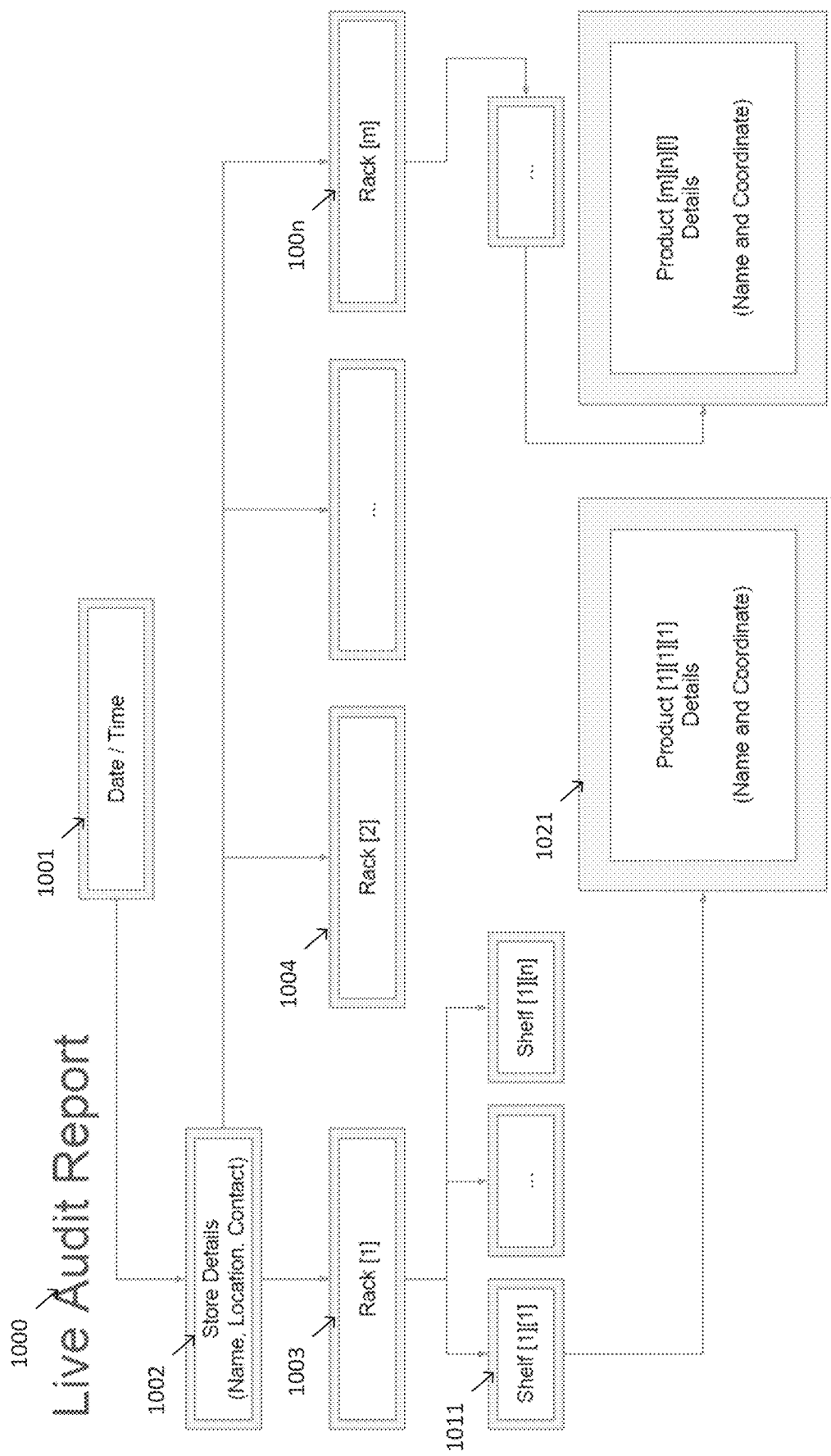
FIG. 10 is a simplified diagram illustrating an example data structure of a live audit report generated shown in FIG. 8, according to some embodiments.

FIG. 10 is a simplified diagram illustrating an example data structure of a live audit report 1000 generated at process 814 shown in FIG. 8, according to some embodiments. The live audit report 1000 may include and be identified by a date and time 1001, e.g., the date and time when the input image 340 is taken. The live audit report further includes the store details 1002, e.g., the name, location, contact information of the store, which may be retrieved from a database. Under the store information, the report may include a number of racks 1003, 1004, . . . 100n, which are identified by rack numbers included in the metadata of each input image 340. In some example, each rack 1003, 1004, . . . , corresponds to an input image 340, and further includes information of multiple shelves, e.g., 1011. The shelf number may each correspond to a sub-image 340a-b shown in FIG. 6. For each shelf 1011, product detail information 1021 for a number of products may be identified. For example, each product may information including a product name, a rack number, a shelf number, a start position and an end position (e.g., slot number of the product on the respective shelf), a number of slots that the product occupies on the respective shelf, and/or the like.

Some examples of computing devices, such as computing device 300, may include non-transitory, tangible, machine readable media that include executable code that when run by one or more processors (e.g., processor 310) may cause the one or more processors to perform the processes of method 800. Some common forms of machine readable media that may include the processes and sub-processes of method 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for obtaining information on product inventory and placement in a retail setting, the system comprising:
a communication interface that receives a first image including first unannotated image data indicative of at least one shelf and one object in the retail setting;
a memory containing machine readable medium storing machine executable code; and
one or more processors coupled to the memory and configurable to execute the machine executable code to cause the one or more processors to:
detect one or more shelves in the retail setting from the first unannotated image data;
segment the image into one or more sub-images corresponding to the one or more detected shelves;
for each sub-image corresponding to a respective detected shelf, detect a product name and a number of appearances of the product name using text recognition on the respective sub-image;
derive first product inventory information and first placement information relating to a product having the detected product name based at least in part on the detected number of appearances and a shelf level corresponding to the sub-image from which the product name is detected.

2. The system of claim 1, wherein the machine executable code causes the one or more processors further to generate a report based on the derived product inventory and placement information in response to the receipt of the first image.

3. The system of claim 1, wherein the communication interface receives metadata associated with the first image captured by an image capture device, and wherein the metadata includes identifying information of a rack that the first image is taken at.

4. The system of claim 1, wherein the machine executable code causes the one or more processors further to allocate a shelf identifier to each sub-image while segmenting the first image into one or more sub-images corresponding to the one or more detected shelves.

5. The system of claim 1, wherein the machine executable code causes the one or more processors further to:
for each sub-image:
detect a first textual area on the respective sub-image;
identify a first text within the detected textual area via text recognition;
query a product database based on the identified first text; and
identify the product name based on a first query result.

6. The system of claim 5, wherein the machine executable code causes the one or more processors further to:
for the respective sub-image:
detect a second textual area within a pre-defined distance to the first textual area;
identify a second text within the detected textual area via text recognition;
combine the first text and the second text to form a third text;
query the product database based on the third text;
identify the product name based on the third text when the third text at least partially matches a second query result.

7. The system of claim 1, wherein the machine executable code causes the one or more processors further to:
derive the first product inventory information for the detected product name by:
determining a number of appearances of the detected product name within each sub-image; and
aggregating the number of appearances of the detected product name across the one or more sub-images.

8. The system of claim 1, wherein the machine executable code causes the one or more processors further to:
derive the first product placement information for the detected product name by:
for each sub-image corresponding to a respective shelf:
determining a start coordinate and an end coordinate on the respective shelf corresponding to the product having the detected product name; and
associating a rack number, a shelf number corresponding to the respective shelf, the start and the end coordinates with the product name.

9. The system of claim 1, wherein the communication interface receives a second image including second unannotated image data indicative of the at least one shelf and the one object and the machine executable code causes the one or more processors further to:
derive second product inventory information and second placement information relating to the product having the detected product name.

10. The system of claim 9, wherein the machine executable code causes the one or more processors further to:
determine a first confidence indicator associated with the first product inventory information and the first placement information based on a first quality of the first image;
determine a second confidence indicator associated with the second product inventory information and the second placement information based on a second quality of the second image; and
adopt one of the first product inventory information and the first placement information, and the second product inventory information and the second placement information based on a comparison of the first confidence indicator and the second confidence indicator.

11. A method for obtaining information on product inventory and placement in a retail setting, the method comprising:
receiving, via a communication interface, a first image including first unannotated image data indicative of at least one shelf and one object in the retail setting;
detecting, via a processor, one or more shelves in the retail setting from the first unannotated image data;
segment, via the processor, the image into one or more sub-images corresponding to the one or more detected shelves;
for each sub-image corresponding to a respective detected shelf, detecting a product name and a number of appearances of the product name using text recognition on the respective sub-image;
deriving first product inventory information and first placement information relating to a product having the detected product name based at least in part on the detected number of appearances and a shelf level corresponding to the sub-image from which the product name is detected.

12. The method of claim 11, further comprising generating a report based on the derived product inventory and placement information in response to the receipt of the first image.

13. The method of claim 11, further comprising receiving metadata associated with the first image captured by an image capture device, and wherein the metadata includes identifying information of a rack that the first image is taken at.

14. The method of claim 11, further comprising allocating a shelf identifier to each sub-image while segmenting the first image into one or more sub-images corresponding to the one or more detected shelves.

15. The method of claim 11, further comprising:
for each sub-image:
  detecting a first textual area on the respective sub-image;
  identifying a first text within the detected textual area via text recognition;
  querying a product database based on the identified first text; and
  identifying the product name based on a first query result.

16. The method of claim 15, further comprising:
for the respective sub-image:
  detecting a second textual area within a pre-defined distance to the first textual area;
  identifying a second text within the detected textual area via text recognition;
  combining the first text and the second text to form a third text;
  querying the product database based on the third text;
  identifying the product name based on the third text when the third text at least partially matches a second query result.

17. The method of claim 11, further comprising:
deriving the first product inventory information for the detected product name by:
  determining a number of appearances of the detected product name within each sub-image; and
  aggregating the number of appearances of the detected product name across the one or more sub-images.

18. The method of claim 11, further comprising:
deriving the first product placement information for the detected product name by:
  for each sub-image corresponding to a respective shelf:
    determining a start coordinate and an end coordinate on the respective shelf corresponding to the product having the detected product name; and
    associating a rack number, a shelf number corresponding to the respective shelf, the start and the end coordinates with the product name.

19. The method of claim 11, further comprising:
receiving a second image including second unannotated image data indicative of the at least one shelf and the one object; and
deriving second product inventory information and second placement information relating to the product having the detected product name.

20. The method of claim 19, further comprising:
determining a first confidence indicator associated with the first product inventory information and the first placement information based on a first quality of the first image;
determining a second confidence indicator associated with the second product inventory information and the second placement information based on a second quality of the second image; and
adopting one of the first product inventory information and the first placement information, and the second product inventory information and the second placement information based on a comparison of the first confidence indicator and the second confidence indicator.

* * * * *